United States Patent
Ogata et al.

[11] Patent Number: 5,883,766
[45] Date of Patent: Mar. 16, 1999

[54] MAGNETIC HEAD WITH GROOVE POSITIONED TO IDENTIFY HEAD ORIENTATION

[75] Inventors: Seiichi Ogata; Tadashi Saito; Kumi Takahashi, all of Miyagi, Japan

[73] Assignee: Sony Corporation, Tokyo, Japan

[21] Appl. No.: 899,045

[22] Filed: Jul. 23, 1997

[30]     Foreign Application Priority Data

Jul. 25, 1996 [JP] Japan .................................. 8-196417

[51] Int. Cl.⁶ .................................................. G11B 5/147
[52] U.S. Cl. ......................................................... 360/126
[58] Field of Search .................... 360/126, 123, 360/125

[56]         References Cited

U.S. PATENT DOCUMENTS 5,726,841  3/1998  Tong ........................................ 360/126

Primary Examiner—A. J. Heinz
Attorney, Agent, or Firm—Hill & Simpson

[57]               ABSTRACT

In a magnetic head which can be mounted in large number on a rotating drum in large number and cope with a highfrequency band, a leading core and a trailing core can be easily discriminated from each other, and the type of a magnetic head can be easily identified. There is disclosed a magnetic head including a pair of magnetic head halfmembers obtained by forming magnetic metal layers serving as magnetic cores on a part on a nonmagnetic substrate and a thinfilm coil buried in the pair of magnetic head halfmembers, the pair of magnetic head halfmembers being joined to each other through a magnetic gap formed between the magnetic metal layer of one magnetic head halfmember and the magnetic metal layer of the other magnetic head halfmember, wherein an identification groove is formed in one magnetic head halfmember, and the formed identification groove makes the appearances of the pair of magnetic head halfmembers asymmetrical.

3 Claims, 13 Drawing Sheets

MAGNETIC HEAD WITH GROOVE POSITIONED TO IDENTIFY HEAD ORIENTATION

BACKGROUND OF THE INVENTION

1. Field of the Invention

The present invention relates to a magnetic head being suitable for a video cassette recorder, a video tape recorder, a magnetic disk apparatus, or the like and, more particularly, to a magnetic head having a coil which is formed by a thinfilm process.

2. Description of the Related Art

As a magnetic head used in a magnetic recording/reproducing apparatus such as a video cassette recorder, a video tape recorder, or a magnetic disk apparatus, a metalingap (MIG) type magnetic head in which a magnetic metal film is formed on a magnetic gap forming surface of a magnetic core consisting of ferrite or a socalled laminate type magnetic head in which a magnetic metal film is sandwiched by a pair of nonmagnetic ceramic substrates, and the like are in practical use.

The magnetic head copes with improvement on image quality or progressing of digitalization. For this reason, the magnetic head must exhibit preferable electromagnetic conversion characteristics in a highfrequency band to obtain highdensity recording performance. However, the MIG type magnetic head is not preferably used in a highfrequency band because its high impedance. In the laminate type magnetic head, a magnetic metal film constituting a magnetic path must be decreased in thickness when a track width is reduced for highdensity recording, and, therefore, reproducing efficiency is degraded.

As in a helicalscantype magnetic recording/reproducing apparatus, in a magnetic recording/reproducing apparatus in which a recording/reproducing operation is performed while a magnetic head is rotated, the magnetic head is mounted on a rotating drum. At this time, in a MIG type magnetic head or a laminate type magnetic head, a magnetic head is adhered to a terminal plate, and the terminal plate is fixed to a rotating drum, thereby mounting the magnetic head on the rotating drum. Here, the terminal plate includes a terminal corresponding to a lead line extending from a coil wound on the magnetic core of the magnetic head. The coil wound on the magnetic core and an external circuit are rendered conductive to each other through the terminal plate.

In a magnetic recording/reproducing apparatus in which a magnetic head is mounted on a rotating drum as described above, in order to increase a data transfer rate, a large number of magnetic heads are desirably mounted on a small rotating drum.

However, a terminal plate generally has a large size. For this reason, according to the method in which a magnetic head is adhered to a terminal plate and fixed thereto, and the magnetic head is mounted on a rotating drum as described above, a large number of magnetic heads cannot be easily mounted on a small rotating drum. More specifically, since an MIG type magnetic head or a laminate type magnetic head requires a terminal plate when the head is mounted on the rotating drum, the magnetic heads mounted on the rotating drum are limited in number.

As a magnetic head which solves the problem on the MIG type magnetic head or the laminate type magnetic head described above and copes with a highfrequency band, for example, as described in Japanese Unexamined Patent Publication No. 63231713, a magnetic head (to be referred to as a bulk thinfilm head hereinafter) in which a magnetic path constituted by a magnetic metal layer is made small, and a coil for driving a magnetic head is formed by using a thinfilm process is proposed.

As shown in FIG. 1, a bulk thinfilm head 100 includes a magnetic head halfmember 103a in which a magnetic metal layer 102a serving as a magnetic core is formed on a part on a nonmagnetic substrate 101a and, similarly, a magnetic head halfmember 103b in which a magnetic metal layer 102b serving as a magnetic core is formed on a part on a nonmagnetic substrate 101b. One pair of magnetic head halfmembers 103a and 103b are joined to each other such that the magnetic metal layer 102a of one magnetic head halfmember 103a opposes the magnetic metal layer 102b of the magnetic head halfmember 103b through a magnetic gap g1.

In the bulk thinfilm head 100, thinfilm coils are buried into one pair of magnetic head halfmembers 103a and 103b to be wound on the magnetic metal layers 102a and 102b. External connection terminals 104a and 104b extending from the thinfilm coils are formed to be exposed on the side surface of the bulk thinfilm head 100.

In the bulk thinfilm head, in addition to excellent characteristics in a highfrequency band, the coils for driving the magnetic head are buried in the magnetic head halfmembers serving as the thinfilm coils. For this reason, the magnetic head can be directly mounted on the rotating drum without using a terminal plate. More specifically, in the bulk thinfilm head, the coil for driving the magnetic head is constituted by the thinfilm coil buried in the magnetic head, and the terminal extending from the thinfilm coil is formed to be exposed outside the magnetic head. For this reason, the magnetic head can be mounted on the rotating drum without using a terminal plate. Therefore, in the bulk thinfilm head, a large number of magnetic heads can be mounted on a small rotating drum.

In a conventional MIG type magnetic head or a conventional laminate type magnetic head, when a magnetic head is adhered to a terminal plate and fixed thereto, the left and right winding guide grooves for winding a coil for driving the magnetic head are made different from each other to prevent the magnetic head from being erroneously adhered to the adhering surface of the terminal plate.

More specifically, for example, as shown in FIG. 2 which shows an example of the MIG type magnetic head, the width of a winding guide groove 111a formed in one magnetic core 110a is increased, and the width of a winding guide groove 111b formed in the other magnetic core 110b is decreased. In this manner, a leading core serving as a magnetic core on the side on which a magnetic recording medium advances during a recording/reproducing operation can be discriminated from a trailing core serving as the other magnetic core.

In contrast to this, in a bulk thinfilm head, since a thinfilm head serving as a coil for driving a magnetic head is used, no winding guide groove is required. Therefore, in the bulk thinfilm head, the shape of the leading core and the shape of the trailing core are symmetrical. For this reason, in the bulk thinfilm head, it is disadvantageously difficult to discriminate the leading core from the trailing core.

In the MIG type magnetic head or the laminate type magnetic head, when the color or the like of the terminal plate is changed, different types of magnetic heads, i.e., magnetic heads respectively having different azimuths, can be discriminated from each other.

On the other hand, a large number of magnetic heads can be mounted on a small rotating drum without using terminal plates. However, when the magnetic heads are to be directly mounted on the rotating drum without using terminal plates, the types of the magnetic heads cannot be discriminated from each other depending on the colors or the like of terminal plates.

SUMMARY OF THE INVENTION

The present invention has been made in consideration of the above conventional circumstances, and has as its object to, in a large number of magnetic heads which can be mounted on a rotating drum and cope with a highfrequency band, make discrimination between a leading core and a trailing core easy and make identification of the types of magnetic heads easy.

A magnetic head according to the present invention completed to achieve the above object includes a pair of magnetic head halfmembers obtained by forming a magnetic metal layer serving as a magnetic core on at least one portion on a nonmagnetic substrate, and a thin-film coil buried in at least one of the pair of magnetic head halfmembers, wherein the pair of magnetic head halfmembers are joined to each other opposite to each other through a magnetic gap formed between the magnetic metal layer of one magnetic head halfmember and the magnetic metal layer of the other head halfmember such that the magnetic head halfmembers are opposite to each other. At least one groove is formed in at least one of the nonmagnetic substrate of one magnetic head halfmember and the nonmagnetic substrate of the other magnetic head halfmember. When the groove described above is formed, the appearance of one magnetic head halfmember and the appearance of the other hand halfmember are made asymmetrical. Note that the groove is formed, e.g., in the opposite surface of the pair of magnetic halfmembers.

In the magnetic head according to the present invention, since the outline of one magnetic head halfmember and the outline of the other magnetic head halfmember are made asymmetrical, the leading core can be easily discriminated from the trailing core.

By forming the groove in the nonmagnetic substrate of the magnetic head halfmember, when the outline of one magnetic head halfmember and the outline of the other magnetic head halfmember are made asymmetrical, the number and shapes of grooves or positions where the grooves are formed are changed depending on the type of a magnetic head. In this manner, the type of the magnetic head can be identified.

In addition, a magnetic head according to the present invention is a socalled bulk thinfilm head including a pair of magnetic head halfmembers obtained by forming a magnetic metal layer serving as a magnetic core on at least one part on a nonmagnetic substrate and a thinfilm coil buried in at least one of the pair of magnetic head halfmembers, the pair of magnetic head halfmembers being joined to each other through a magnetic gap formed between the magnetic metal layer of one magnetic head halfmember and the magnetic metal layer of the other magnetic head halfmember. A large number of magnetic heads according to the present invention can be mounted on a small rotating drum and exhibit electromagnetic conversion characteristics which are preferable in a highfrequency band.

DESCRIPTION OF THE PREFERRED EMBODIMENTS

Embodiments of the present invention will be described below with reference to the accompanying drawings.

Figure 1:
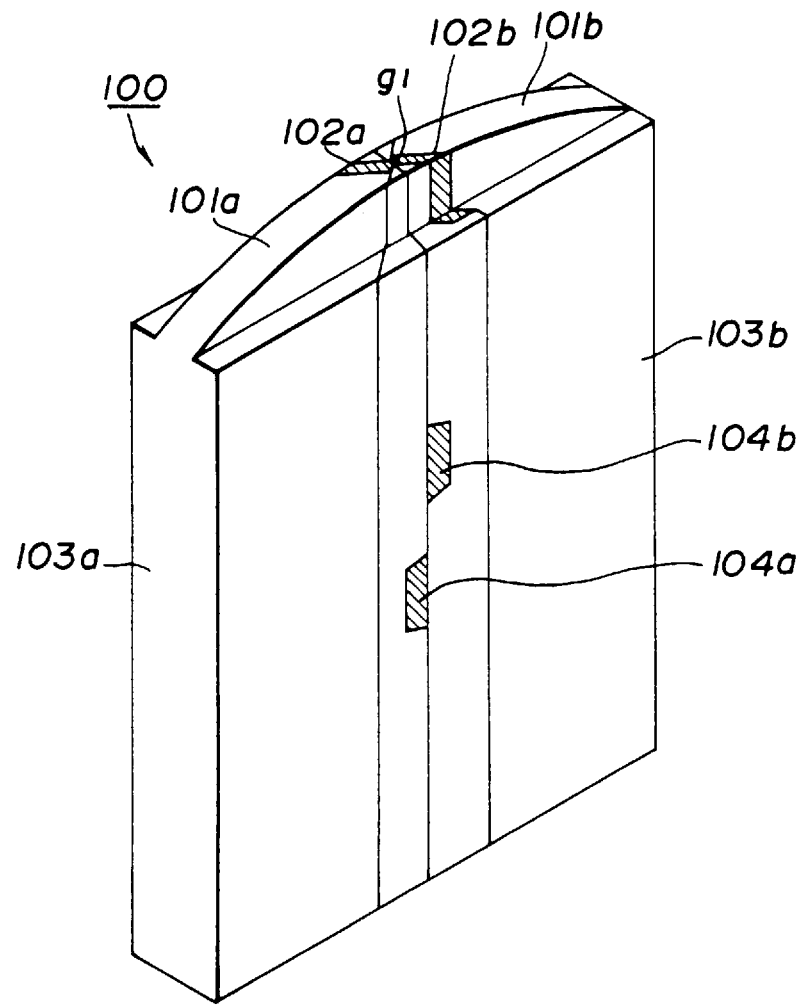
FIG. 1 is a perspective view showing an example of a conventional bulk thinfilm head.
Figure 2:
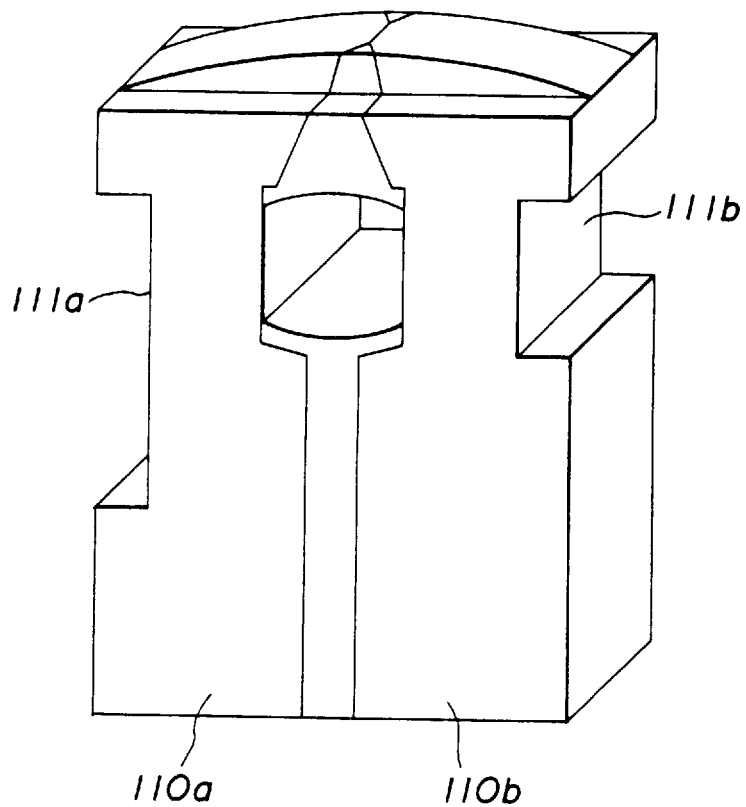
FIG. 2 is a perspective view showing an example of a conventional MIG type magnetic head.
Figure 3:
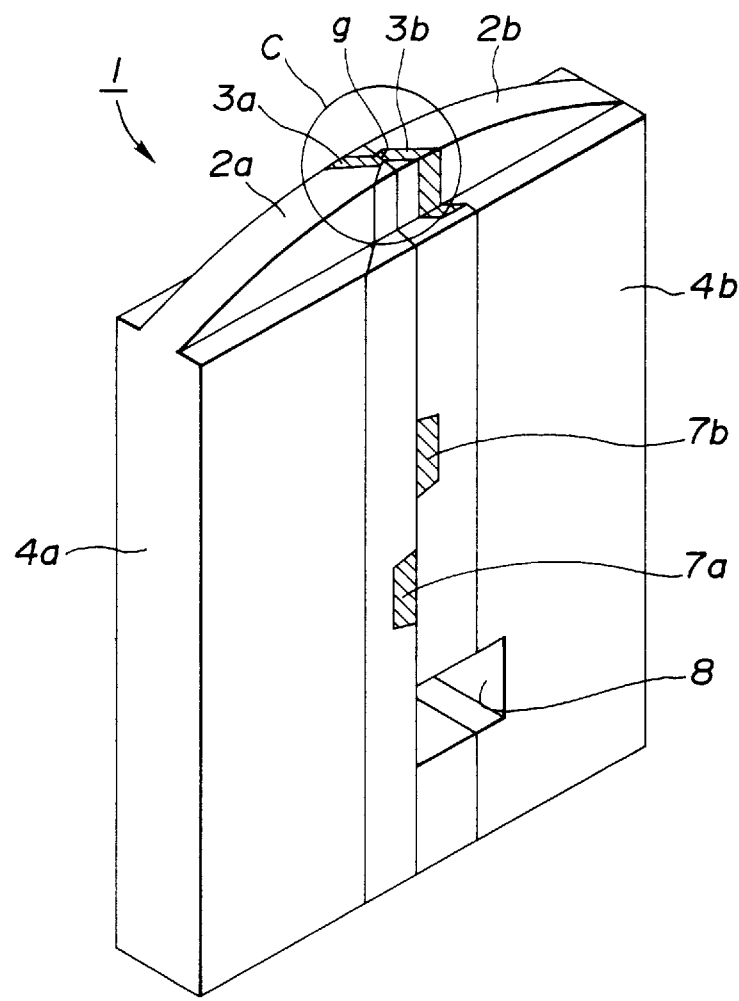
FIG. 3 is a perspective view showing an example of a magnetic head to which the present invention is applied.
Figure 4:
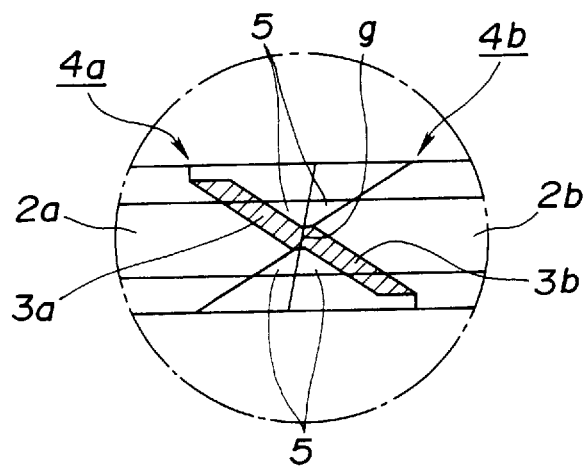
FIG. 4 is an enlarged plan view showing a portion near the magnetic gap of the magnetic head shown in FIG. 3.
Figure 5:
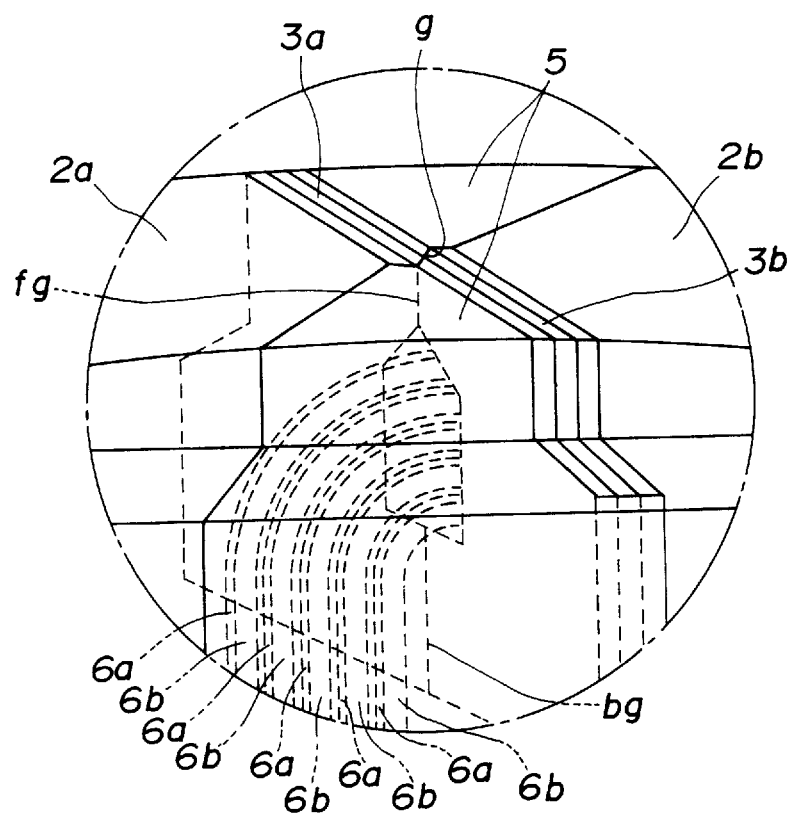
FIG. 5 is an enlarged perspective view showing a part near the magnetic gap of the magnetic head shown in FIG. 3.

An example of a magnetic head to the present invention is applied is shown in FIGS. 3, 4, and 5. FIG. 3 is a perspective view showing an entire magnetic head 1 to which the present invention is applied; FIG. 4 is a plan view showing a portion of an area C, i.e., a portion near a magnetic gap g of the magnetic head 1 when viewed from the magnetic gap g side; and FIG. 5 is a perspective view showing a portion of the area C in FIG. 3, i.e., a portion near the magnetic gap g of the magnetic head 1, which is partially transmitted.

The magnetic head 1 is a bulk thinfilm head used in a video cassette recorder or the like and, as shown in FIGS. 3 to 5, includes a magnetic head halfmember 4a in which a magnetic metal layer 3a serving as a magnetic core is formed on a portion on a nonmagnetic substrate 2a and a magnetic head halfmember 4b in which a magnetic metal layer 3b is formed on a portion on a nonmagnetic substrate 2b like the magnetic head halfmember 4a.

The pair of magnetic head halfmembers 4a and 4b are joined to each other such that the magnetic metal layer 3a of one magnetic head halfmember 4a opposes the magnetic metal layer 3b of the other magnetic head halfmember 4b through the magnetic gap g. A magnetic core is formed by these magnetic metal layers 3a and 3b.

Here, a portion between the opposite surfaces of the pair of magnetic head halfmembers 4a and 4b is filled with a lowmeltingpoint glass 5. The lowmeltingpoint glass 5 makes the opposite surfaces of the pair of magnetic head halfmembers 4a and 4b parallel to each other, and the pair of magnetic head halfmembers 4a and 4b are joined to each other.

Of magnetic gaps formed between the magnetic metal layer 3a and the magnetic metal layer 3b, a magnetic gap formed on opposite surfaces at end portions of the magnetic metal layers 3a and 3b on the recording media sliding surface side, i.e., a magnetic gap serving as a recording/reproducing gap is called a front gap fg. On the other hand a magnetic gap formed on the opposite surfaces at the other end portions the magnetic metal layers 3a and 3b on the other end portions of the magnetic metal layers 3a and 3b is called a back gap bg.

In the magnetic head 1, as shown in FIG. 5, thinfilm coils 6a and 6b which are formed in spiral shapes are buried in the opposite surfaces of the pair of magnetic head halfmembers 4a and 4b. The thinfilm coils 6a and 6b are formed such that a Cu film is filled in coillike grooves formed on the opposite surfaces of the pair of magnetic head halfmembers 4a and 4b by an electrolytic plating method. Note that the thinfilm coils 6a and 6b may be formed such that a conductive paste containing Ag or the like is filled in coillike grooves and then sintered.

An end portion (on the center side) of the thinfilm coil 6a formed in one magnetic head halfmember 4a and an end portion (on the center side) of the thinfilm coil 6b formed in the other magnetic head halfmember 4b are connected to each other when the pair of magnetic head halfmembers 4a and 4b are joined to each other opposite to each other. As shown in FIG. 3, the external connection terminals 7a and 7b are led from an end portion (on outer edge side) of the thinfilm coil 6a formed in one magnetic head halfmember 4a and an end portion (on outer edge side) of the thinfilm coil 6b formed in the other magnetic head halfmember 4b. The external connection terminals 7a and 7b are arranged to be exposed on the side surface of the magnetic head 1. When the magnetic head 1 is used, the external connection terminals 7a and 7b are connected to an external circuit, recording signals are supplied to the thinfilm coils 6a and 6b through the external connection terminals 7a and 7b, or reproduced signals are extracted from the thinfilm coils 6a and 6b.

Here, the magnetic head 1 in which the thinfilm coils 6a and 6b are formed in both the pair of magnetic head halfmembers 4a and 4b has been exemplified. However, a thinfilm coil may be formed in only one of the pair of magnetic head halfmembers 4a and 4b.

In the magnetic head 1, as shown in FIG. 3, an identification groove 8 is formed on the magnetic head halfmember opposite surface of one magnetic head halfmember 4b. The identification groove 8 is formed to serve as an opening portion bored through the magnetic head 1 when the pair of magnetic head halfmembers 4a and 4b are opposite to each other. Due to the formation of the identification groove 8, the appearance of one magnetic head halfmember 4a and the appearance of the other magnetic head halfmember 4b are asymmetrical. Therefore, in the magnetic head 1, a leading core can be easily discriminated from a trailing core.

Here, the magnetic head 1 in which the identification groove 8 is formed on the magnetic head halfmember opposite surface of one magnetic head halfmember 4b has been exemplified. However, the identification groove 8 may be formed such that the appearance of one magnetic head halfmember 4a and the appearance of the other magnetic head halfmember 4b are asymmetrical to make it possible to identify the left and right of the magnetic head 1. For example, the identification groove 8 may be formed on a side surface or the like of the magnetic head 1.

The magnetic head 1 will be described below with reference to a method of manufacturing the magnetic head 1.

Figure 6:
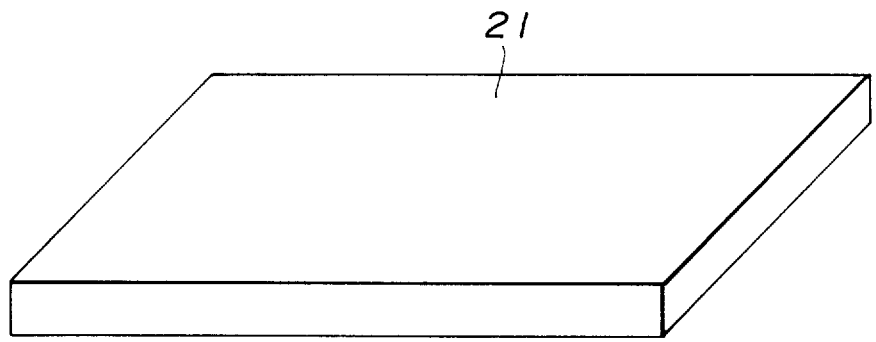
FIG. 6 is a perspective view showing a typical planar substrate consisting of a nonmagnetic material.

When the magnetic head 1 is to be manufactured, a planar substrate 21 consisting of a nonmagnetic material such as an MnO-NiO mixed sintered material as shown in FIG. 6 is prepared. As the material of the substrate 21, not only MnO-NiO but also various nonmagnetic materials can be used. For example, potassium titanate, calcium titanate, barium titanate, zirconium oxide, alumina, alumina titanium carbide, $SiO_2$, Zn ferrite, crystal glass, highharness glass, or the like is used. Here, the dimensions of the substrate 21 are about 30 mm in length, about 30 mm in width, and about 2 mm in thickness.

Figure 7:
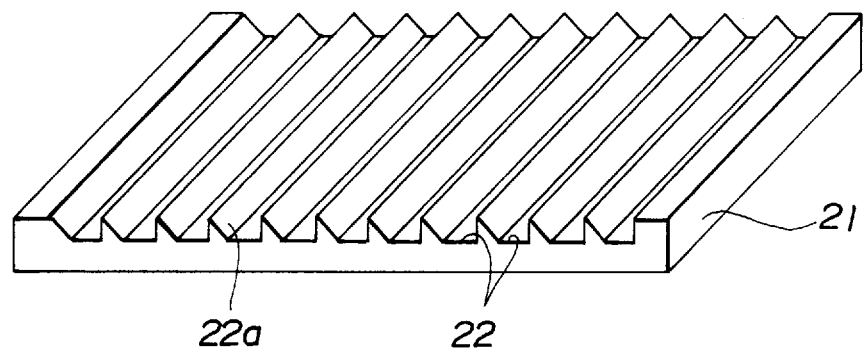
FIG. 7 is a perspective view showing a typical state wherein a magnetic groove in a substrate.

As shown in FIG. 7, in order to form an inclined surface on which a magnetic metal layer serving as a magnetic core is formed, i.e., a magnetic core forming surface, on the substrate 21, a plurality of magnetic core grooves 22 are formed parallel to each other at equal intervals such that one surface of each magnetic core groove 22 serves as an inclined surface 22a.

Here, although the inclination of the inclined surface 22a may be about 25 to 60, about 35 to 50 is desirably set in consideration of a pseudo gap, a track width precision, or the like. More specifically, for example, the magnetic core groove 22 is formed such that the inclination of the inclined surface 22a is set to about 45 by using a grinding stone molded to have a 45 surface. The magnetic core groove 22 has, e.g., about 130 $\mu$m in depth and about 150 $\mu$m in width.

Figure 8:
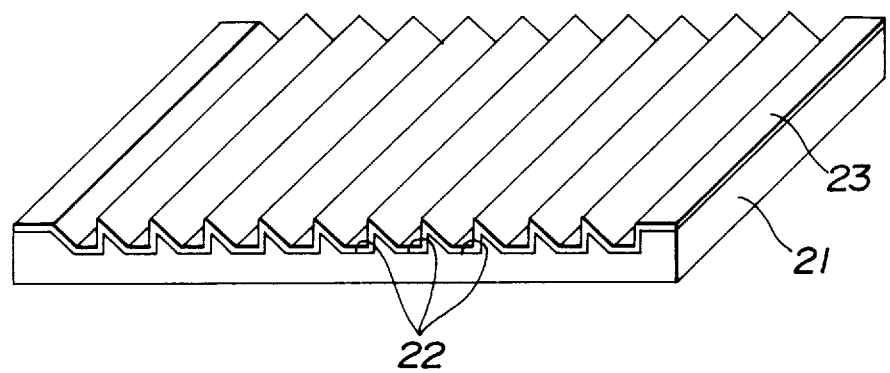
FIG. 8 is a perspective view showing a typical state wherein a magnetic metal layer is formed on a substrate.

As shown in FIG. 8, a magnetic metal layer 23 is formed on the substrate 21 in which the magnetic core grooves 22 are formed.

Here, the magnetic metal layer 23 may be constituted by a single magnetic metal layer. However, the magnetic metal layer 23 is preferably constituted by stacking a plurality of magnetic metal films through insulating films to high sensitivity in a highfrequency area. In such a structure, since the magnetic metal layer 23 is divided into a plurality of layers, overcurrent loss is reduced, and, in particular, characteristics in a highfrequency area are improved.

When the magnetic metal layer 23 has a multilayered structure as described above, the thickness of an insulating film is required to obtain a sufficient insulating effect, and the thickness must be made as small as possible to prevent an effective track width from being excessively reduced by the insulating film.

More specifically, the magnetic metal layer 23, for example, is formed such that magnetic metal films each consisting of an Fe—Al—Si alloy (Sendust) and each having a thickness of about 5 $\mu$m and an insulating film each consisting of alumina and each having a thickness of about 0.15 $\mu$m are alternately stacked to form a threelayer magnetic metal film.

Here, the material of the magnetic metal film is not limited to an Fe—Al—Si alloy, a material having a high-saturation magnetic flux density and soft magnetic characteristics may be used. For example, an Fe—Al alloy, an Fe—Ga—Si alloy, an Fe—Si—Co alloy, or a nitridebased or carbidebased softmagnetic alloy is used. The material of the insulating film is not limited to alumina. For example, $SiO_2$, SiO, or a mixture thereof can be used.

As a method of forming the magnetic metal layer 23, sputtering is preferably used. However, a physical film formation method (PVD) such as deposition or molecular beam epitaxy (MBE) can be popularly applied. In addition, a chemical film formation method such as a gasphase growing (CVD) with a chemical reaction can also be applied.

Figure 9:
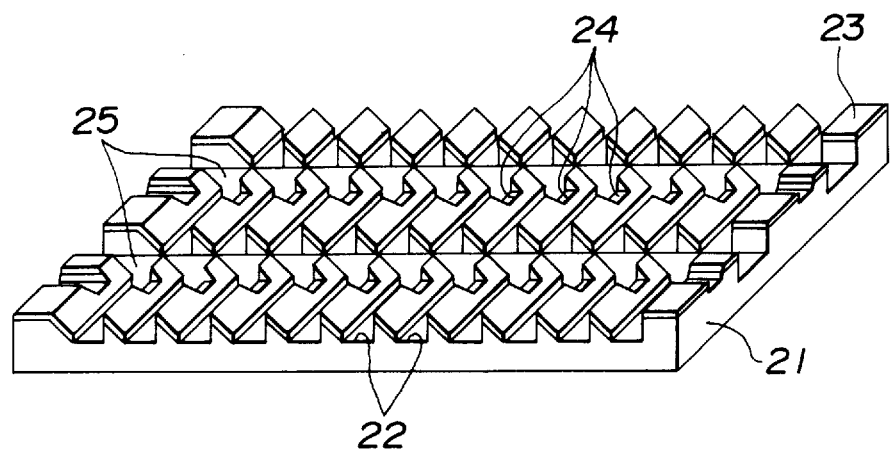
FIG. 9 is a perspective view showing a typical state wherein a winding groove and a separation groove are formed in a substrate on which a magnetic metal layer is formed.

As shown in FIG. 9, on the major surface of the substrate 21 on which the magnetic metal layer 23 is formed, a winding groove 24 for forming a thinfilm coil wound on the magnetic core and a separation groove 25 for separating the magnetic metal layer 23 from each magnetic core are formed in a direction perpendicular to the longitudinal direction of the magnetic core grooves 22. FIG. 9 shows a case wherein two winding grooves 24 and two separation grooves 25 are formed. However, the number of the winding grooves 24 and the number of separation grooves 25 must be set to the number of thinfilm coil rows. When three or more thinfilm rows are formed, the winding grooves 24 and the separation groove 25 are formed in number equal to the number of thinfilm coil rows.

Here, in the winding groove 24, an inclined surface on the front gap fg side is formed by a grinding stone having a 45 inclined surface, so that the magnetic metal layer 23 on the front gap fg side is obliquely tapered toward the front gap fg. In this manner, when the magnetic metal layer 23 on the front gap fg side is tapered toward the front gap fg, magnetic fluxes are concentrated on the front gap fg, and higher recording sensitivity can be obtained. However, the shape of the winding groove 24 may have a shape that the magnetic metal layer 23 on the front gap fg side is tapered toward the front gap fg, and the angle of the inclined surface of the winding groove 24 on the magnetic gap g side need not be set to 45. In addition, the shape of the winding groove 24 on the front gap fg may be an arc shape or a polygonal shape.

The thickness of the winding groove 24 is set such that the magnetic metal layer 23 is not divided. When the depth is excessively large, a magnetic path length becomes large, and magnetic flux transmission efficiency is degraded. For this reason, the winding groove 24 is formed to have a depth of about 20 $\mu$m from the top of the inclined surface of the magnetic core groove 22 for example. The width of the winding groove 24 is ruled by the line width or number of turns of the thinfilm coil because the thinfilm coil is formed such that the thinfilm coil passes through the winding groove 24 in the later process. More specifically, the width of the winding groove 24 is set to, e.g., about 140 $\mu$m.

On the other hand, the separation groove 25 may have an arbitrary shape if the separation groove 25 has a depth enough to separates the magnetic metal layers 23 from each other. For example, the separation groove 25 is a rectangular groove which can be easily processed, and is formed to have a depth of about 150 $\mu$m from the bottom surface of the magnetic core groove 22. The width of the separation groove 25 is determined depending on the relationship between the length of the front gap fg and the length of the back gap bg of a desired magnetic head. However, the length of the front gap fg must be larger than a finally desired length of the front gap fg in formation of the separation groove 25 because a recording media sliding surface is wrapped when the magnetic head is finally processed in a predetermined shape. Therefore, for example, the separation groove 25 is formed such that the magnetic metal layer 23 on the front gap fg side in formation of the separation groove 25 has a length of about 300 $\mu$m on the front gap fg side and a length of about 85 $\mu$m on the back gap bg side.

Figure 10:
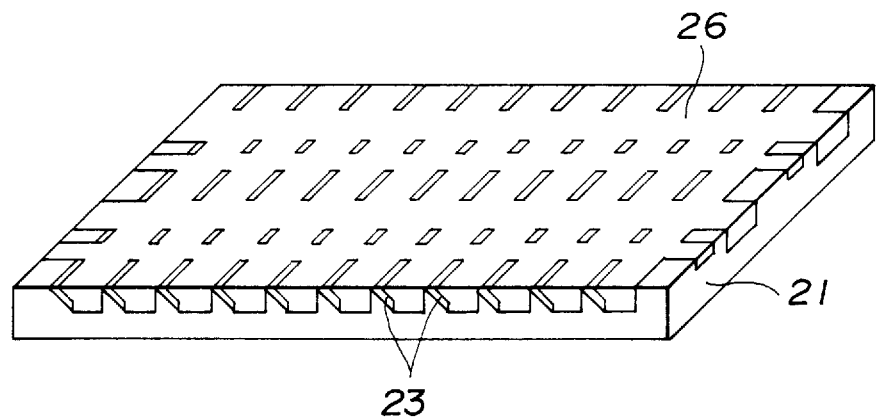
FIG. 10 is a perspective view showing a typical state wherein a lowmeltingpoint glass is filled in a magnetic core groove, a winding groove, and a separation groove.

As shown in FIG. 10, a lowmeltingpoint glass 26 is filled in the magnetic core grooves 22, the winding grooves 24, and the separation grooves 25. Therefore, the surface of the resultant structure is made flat.

Figure 11:
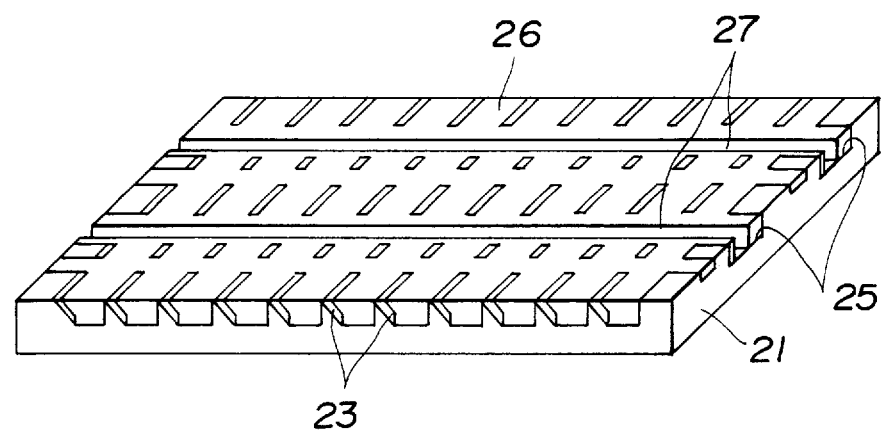
FIG. 11 is a perspective view showing a typical state wherein a terminal groove is formed in the lowmeltingpoint glass.

As shown in FIG. 11, terminal grooves 27 are formed in the lowmeltingpoint glass 26 filled in the separation grooves 25 such that the terminal grooves 27 are parallel to the separation grooves 25. The terminal grooves 27 are grooves for forming external connection terminals led from the thinfilm coil, and the shape, depth, and width of the groove are not limited. For this reason, the terminal groove 27 is a rectangular groove which can be easily processed and has about 100 $\mu$m in depth and width.

Figure 12:
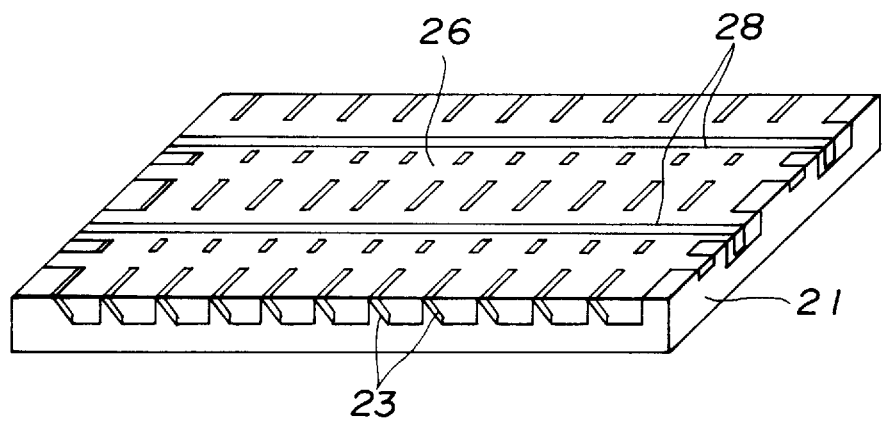
FIG. 12 is a perspective view showing a typical state wherein a conductive material is filled in a terminal groove.

As shown in FIG. 12, a conductive material 28 such as Cu is filled in the terminal grooves 27 by an electrolytic plating method or the like. Thereafter, the surface of the resultant structure is made flat.

Subsequently, as shown in FIGS. 13 to 18, a thinfilm coil passing through the winding groove 24 is formed to be buried in the lowmeltingpoint glass 26 by a thinfilm forming process. Although FIGS. 13 to 18 are enlarged views showing one thinfilm coil, actually, a plurality of thinfilm coils are formed to correspond to the magnetic metal layers 23 separated by the separation grooves 25.

Figure 13:
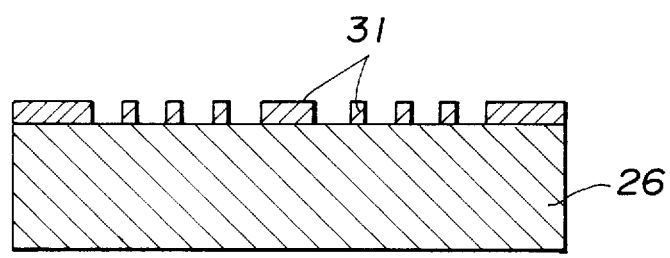
FIG. 13 is a sectional view showing a typical state wherein a resist mask corresponding to a thinfilm coil is formed on a lowmeltingpoint glass.

When the thinfilm coil is formed, as shown in FIG. 13, a resist mask 31 patterned to correspond to the outer shape of a spiral thinfilm coil is formed on the lowmeltingpoint glass 26 by a photolithographic technique.

Figure 14:
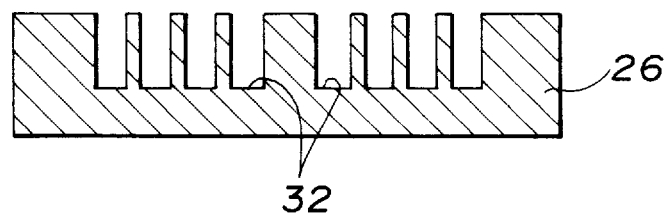
FIG. 14 is a sectional view showing a typical state wherein a lowmeltingpoint glass is etched to form a coillike groove.

Ion etching is performed to the lowmeltingpoint glass 26 by using the resist mask 31 as a mask. Thereafter, the resist mask 31 is removed by using an organic solvent or the like. In this manner, as shown in FIG. 14, a coilshaped groove 32 corresponding to the shape of the resist mask 31 is formed.

Figure 15:
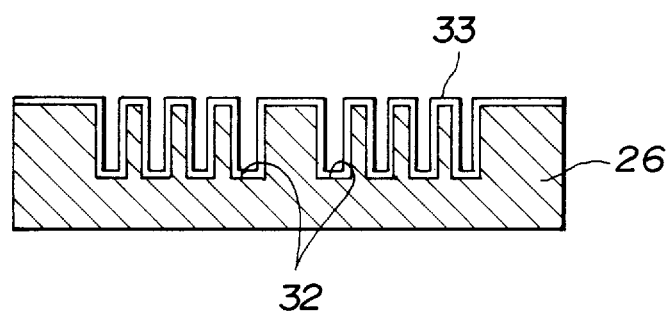
FIG. 15 is a sectional view showing a typical state wherein a conductive underlying film is formed.

As shown in FIG. 15, a conductive underlying film 33 consisting of Cu or the like is formed by sputtering on the entire surface of the lowmeltingpoint glass 26 in which the coilshaped groove 32 is formed. The conductive underlying film 33 may be formed by using a method such as deposition. In order to improve the adhesive property between the conductive underlying film 33 and the lowmeltingpoint glass 26, an underlying film consisting of Ti, alumina, or the like may be formed, and the conductive underlying film 33 may be formed on the underlying film.

Figure 16:
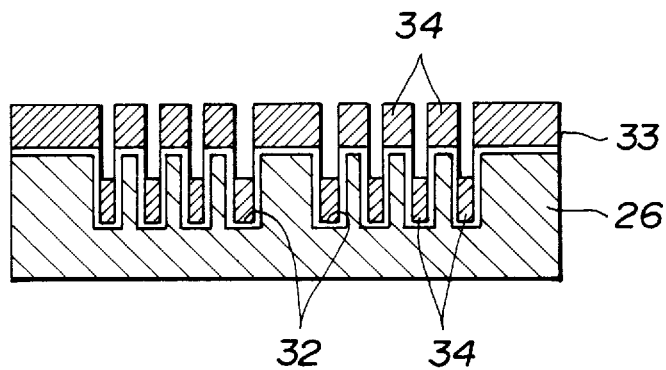
FIG. 16 is a sectional view showing a typical state wherein a Cuplate is grown on the conductive underlying film.
Figure 17:
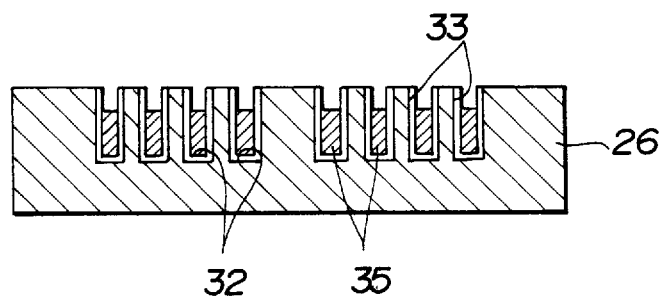
FIG. 17 is a sectional view showing a typical state wherein a thinfilm coil is formed.
Figure 18:
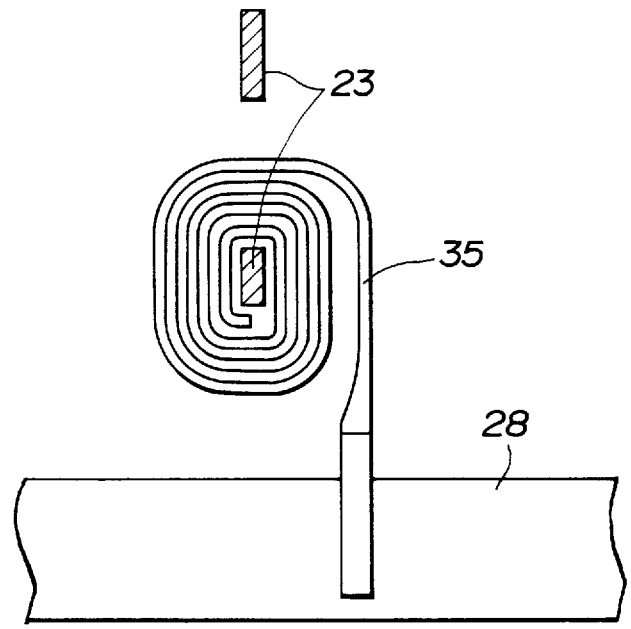
FIG. 18 is a plan view showing a typical state wherein a thinfilm coil is formed.

As shown in FIG. 16, a Cu plate 34 is grown on the conductive underlying film 33 by an electrolytic plating method. Therefore, as shown in FIG. 17, the surface is ground to be flat, and the conductive underlying film 33 and the Cu plate 34 deposited on the other portion than the inner portion of the coilshaped groove 32 are removed. In this manner, the thinfilm coil 35 buried in the coilshaped groove 32 is formed.

The thinfilm coil 35 may be formed by the following method in place of the electrolytic plating method. That is, a conductive paste is filled in the coilshaped groove 32 and then sintered.

When the thinfilm coil 35 is formed as described above, the thinfilm coil 35, as shown in FIG. 18, is spirally formed with respect to a portion near the portion serving as the back gap bg of the magnetic metal layer 23, and an end portion of the outer edge side of the thinfilm coil 35 is connected to the conductive material 28 filled in the terminal grooves 27. In this manner, the conductive material 28 functions as an external connection terminal led from the thinfilm coil 35.

Figure 19:
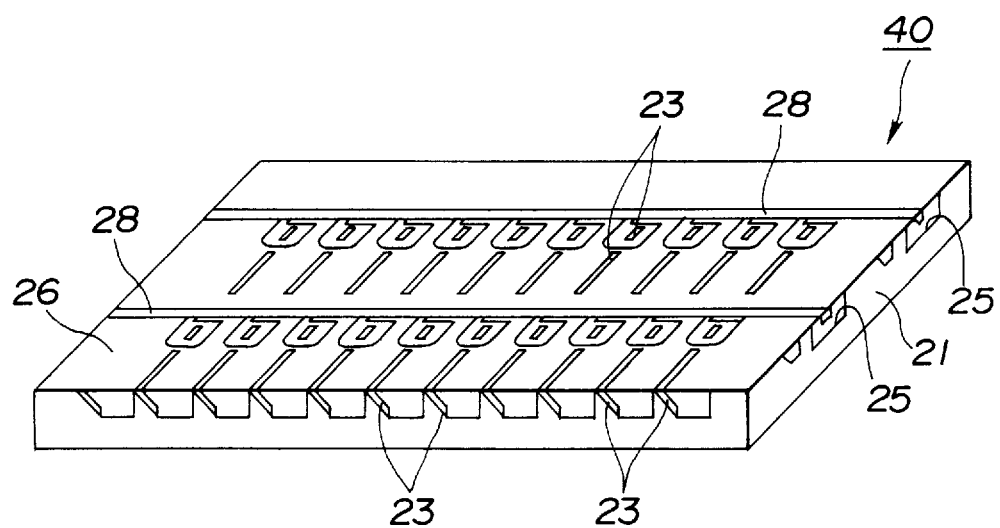
FIG. 19 is a perspective view showing a typical magnetic head block substrate in which a thinfilm coil is buried.

With the above processes, the thinfilm coil 35 buried in the coilshaped groove 32 is formed. More specifically, with the above processes, as shown in FIG. 19, a magnetic head block substrate 40 in which the plurality of thinfilm coils 35 corresponding to the magnetic metal layers 23 separated by the separation grooves 25 are buried in the lowmeltingpoint glass 26 filled on the substrate 21 is completed.

After the magnetic head block substrate 40 having the thinfilm coil 35 buried therein is formed, and an Au thin film is formed on the surface of the magnetic head block substrate 40. The thin film formed in this case may be a thin film such as a Pt thin film or an Ag thin film consisting of a metal other than Au.

Thereafter, resist masks are formed on a portion serving as the front gap fg on the magnetic metal layer 23, a portion serving as the back gap bg on the magnetic metal layer 23, an end portion of the thinfilm coil 35 on the center side, and the outside of the thinfilm coil 35. An Au thin film is etched by a method such as ion milling using the resist mask as a mask.

In this manner, Au thin films are formed on the portion serving as the front gap fg on the magnetic metal layer 23, the portion serving as the back gap bg on the magnetic metal layer 23, the end portion of the thinfilm coil 35 on the center side, and the outside of the thinfilm coil 35.

These Au thin films are used to join a pair of magnetic head block halfmembers obtained by cutting the magnetic head block substrate 40 to each other by an Au diffusion joining process in the later process. The Au thin film formed on the end portion of the thinfilm coil 35 on the center side also functions as a connection conductor for electrically connecting the end portion (on the center side) of the thinfilm coil 35 buried in one magnetic head block halfmember to the end portion (on the center side) of the thinfilm coil 35 buried in the other head block halfmember. In addition, the Au thin films formed on the portions serving as the front gap fg and back gap bg on the magnetic metal layer 23 also function as gap materials to form a magnetic gap formed between the magnetic metal layer 23 of one magnetic head block half member ane the magnetic metal layer 23 of the other magnetic head block halfmember.

Figure 20:
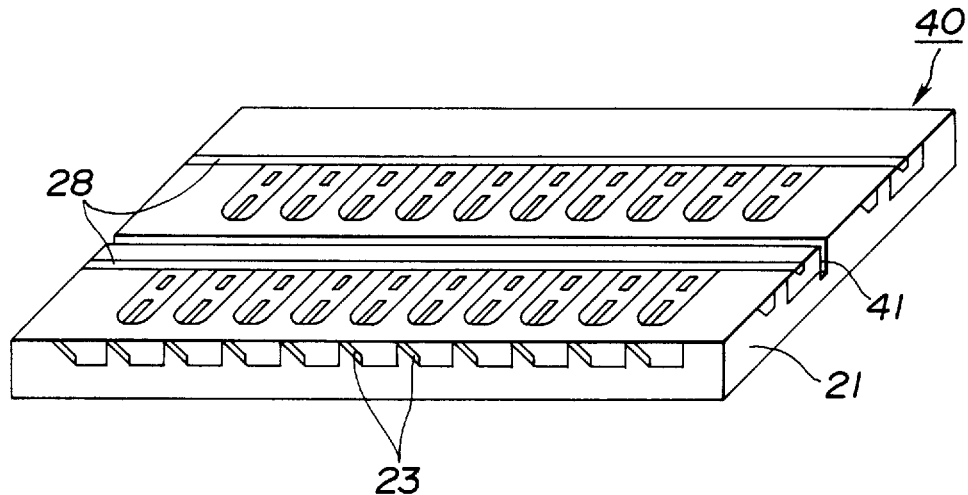
FIG. 20 is a perspective view showing a typical state wherein an identification groove is formed in a magnetic head block substrate.

As shown in FIG. 20, an identification groove 41 parallel to the conductive material 28 filled in the terminal grooves 27 is formed in a portion of the lowmeltingpoint glass 26 filled in one separation groove 25, i.e., a portion between a thinfilm coil row and a thinfilm coil row formed by the above process. The identification groove 41 is formed to identify the left and right of the manufactured magnetic head. When a groove makes the left and right of the magnetic head asymmetrical, its shape, depth, width, and the like may be arbitrarily set.

Figure 21:
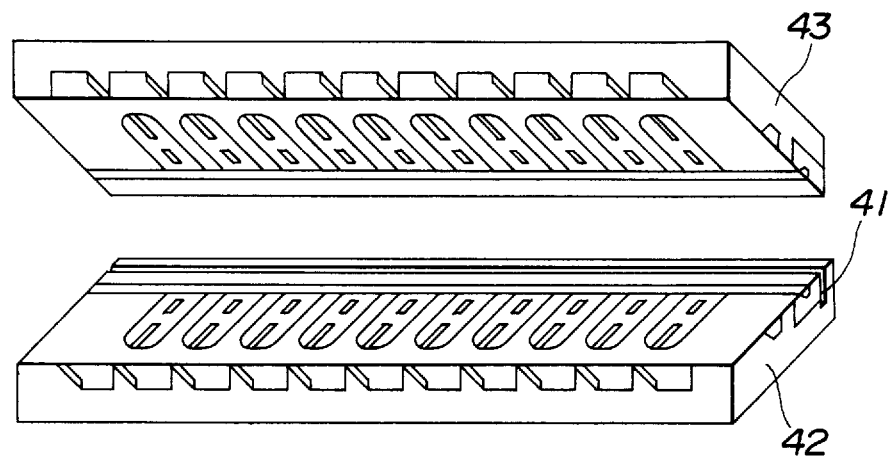
FIG. 21 is a perspective view showing a pair of typical magnetic head block halfmembers obtained by cutting the magnetic head block substrate.

As shown in FIG. 21, the magnetic head block substrate 40 is cut along a line parallel to the terminal grooves 27 to form a pair of magnetic head block halfmembers 42 and 43. At this time, thinfilm coil rows, i.e., a plurality of thinfilm coils 35 arranged in a line along the longitudinal direction, are buried in one magnetic head block halfmember 42. Similarly, thinfilm coil rows, i.e., a plurality of thinfilm coils 35 arranged in a ling along the longitudinal direction, are buried in the other magnetic head block halfmember 43.

Figure 22:
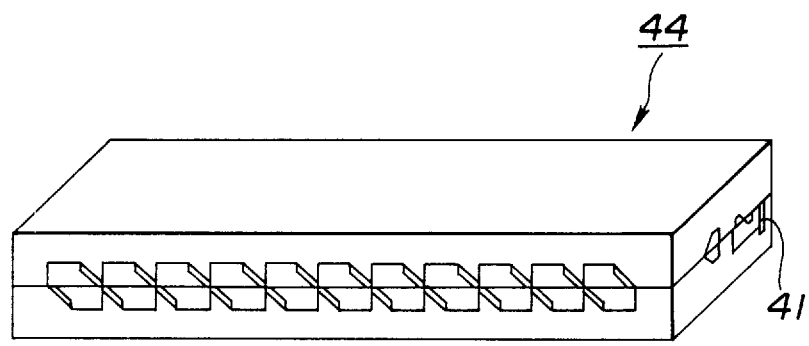
FIG. 22 is a perspective view showing a typical magnetic head block obtained by joining a pair of magnetic head block halfmembers to each other.

As shown in FIG. 22, the magnetic head block halfmembers 42 and 43 are caused to be opposite to each other and heated with pressure, and the pair of magnetic head block halfmembers 42 and 43 are joined to each other by a diffusion joining process using an Au thin film, thereby forming a magnetic head block 44. Note that the temperature at which a diffusion joining process is set to a temperature at which the lowmeltingpoint glass 26 is not melted.

Here, the magnetic head block halfmembers 42 and 43 are joined to each other such that the magnetic metal layer 23 buried in the pair of magnetic head block halfmembers 42 and 43 are opposite to each other through the Au thin film. In this manner, a front gap fg and a back gap bg are formed between the magnetic metal layer 23 of one magnetic head block halfmember 42 and the magnetic metal layer 23 of the other magnetic head block halfmember 43.

Also, the pair of magnetic head block halfmembers 42 and 43 are joined to each other such that the Au thin film formed on the end portion (on the center side) of the thinfilm coil 35 buried in one magnetic head block halfmember 42 is in contact with the Au thin film formed on the end portion (on the center side) of the thinfilm coil 35 buried in the other magnetic head block halfmember 43. In this manner, the thinfilm coil 35 buried in one magnetic head block halfmember 42 and the thinfilm coil 35 buried in the other magnetic head block halfmember 43 are electrically connected to each other.

Here, a case wherein the pair of magnetic head block halfmembers 42 and 43 are joined to each other by a diffusion joining process using the Au thin film has been exemplified. As the joining process, a chemical joining method using an adhesive agent or the like may be used for portions except for the end portion of the thinfilm coil 35 on the center side.

Finally, slicing processing is performed to the magnetic head block 44 obtained by joining the pair of magnetic head block halfmembers 42 and 43 to be cut every magnetic core, and each cut portion is ground into a predetermined shape. In this manner, a magnetic head as shown in FIG. 3 is completed.

According to the method of manufacturing the magnetic head, the magnetic head block substrate 40 is cut every thinfilm coil row to obtain the pair of magnetic head block halfmembers 42 and 43, the pair of magnetic head block halfmembers 42 and 43 are joined to each other, and the resultant structure cut one by one every magnetic core to obtain respective magnetic cores. However, the order of these cutting and joining process can be changed. More specifically, for example, the magnetic head block substrate 40 may cut one by one every magnetic core in advance to form magnetic head halfmembers, and the magnetic head halfmembers are joined to each other to respective magnetic heads. Also, for example, two magnetic head block substrates 40 may be prepared and joined to each other, and the resultant structure may be cut one by one every magnetic core to obtain respective magnetic heads.

In the magnetic head described above, since the left and right of the magnetic head are made asymmetrical by an identification groove, a leading core serving as a magnetic core on a side to which a magnetic recording media comes in a recording/reproducing operation can be easily discriminated from a trailing core serving as the other magnetic core. Therefore, for example, when this magnetic head is mounted on a rotating drum or a terminal plate by adhering, the adhering surfaces are not prevented from being erroneously used.

In a general magnetic head, the position of a magnetic gap is set with reference to an adhering surface to a rotating drum, a terminal plate, or the like. For this reason, if the adhering surfaces are erroneously used, the position of a magnetic gap is offset from a predetermined position. In contrast to this, in a magnetic head to which the present invention is applied, since the adhering surfaces are prevented from being erroneously used, failure of the magnetic gap position caused by erroneous adhering surfaces can be reduced.

In the above description, a magnetic head in which one identification groove is formed is exemplified. The number, shapes, and the like of identification grooves or a position where the identification groove may be changed depending on the type of a magnetic head. In this manner, the type of a magnetic head can be easily identified. For example, when a magnetic head is mounted on a rotating drum or the like, an erroneous type of magnetic head is prevented from being mounted on the rotating drum or the like.

More specifically, for example, one identification groove is formed in a magnetic head of a plus azimuth, and two identification grooves are formed in a magnetic head of a minus azimuth. In this manner, the magnetic head of a plus azimuth and the magnetic head of a minus azimuth can be easily identified. In addition, when the number, shapes, or the like of identification grooves or positions where the identification grooves are formed are changed depending on not only a difference in azimuth but also a difference in track width, a difference in depth of a magnetic gap, a difference in magnetic gap position, or the like, magnetic heads can be easily identified.

Conventionally, the type of a magnetic head is determined by the color of a terminal plate to which the magnetic head is fixed. However, in a direct mount scheme in which a magnetic head is directly adhered to a rotating drum, due to the absence of a terminal plate, the type of a magnetic head cannot be determined by a terminal plate. Therefore, a magnetic head whose type can be easily identified such that the number, shapes, or the like of identification grooves or positions where identification grooves are formed are changed depending on the type of the magnetic head is especially preferable in the direct mount scheme.

As is apparent from the above description, according to the present invention, in a bulk thinfilm head which can be mounted in large number on a rotating drum and exhibits preferable electromagnetic conversion characteristics in a highfrequency band, a leading core can be easily discriminated from a trailing core. Therefore, according to the present invention, when a magnetic head is to be mounted on a rotating drum or the like, the magnetic head can be prevented from being mounted in a reverse direction.

Furthermore, the number or shapes of grooves formed in a nonmagnetic substrate of a magnetic head halfmember or positions where the grooves are formed are changed depending on the type of the magnetic head, the type of the magnetic head can be easily identified. Therefore, according to the present invention, when a magnetic head is to be mounted on a rotating drum or the like, an erroneous type of magnetic head can be prevented from being mounted on the rotating drum or the like.

What is claimed is:

1. A magnetic head comprising:
   a pair of magnetic half members each of which comprises a magnetic core portion and a non-magnetic substrate, the magnetic half member being joined so that the magnetic core portions are joined together in opposing relationship between the non-magnetic substrates, the magnetic core portions having a joint therebetween and forming a magnetic gap therebetween;
   a thin film coil buried in at least one of said magnetic half members; and
   a groove formed in one of the magnetic half members extending perpendicularly from the joint into the magnetic core portion of such magnetic half member, the groove imparting an appearance to the magnetic head that is asymmetrical so that the orientation of the magnetic head can be visually determined.

2. The magnetic head of claim 1, wherein said groove extends entirely through the magnetic head half member so as to provide an opening therethrough.

3. The magnetic head of claim 1, wherein the groove extends perpendicularly from the joint into the non-magnetic substrate of said one magnetic half member.

* * * * *